(12) United States Patent
Pafumi et al.

(10) Patent No.: US 8,352,940 B2
(45) Date of Patent: Jan. 8, 2013

(54) VIRTUAL CLUSTER PROXY TO VIRTUAL I/O SERVER MANAGER INTERFACE

(75) Inventors: James A. Pafumi, Leander, TX (US); Veena Patwari, Austin, TX (US); Priya Paul, Round Rock, TX (US); Steven Edward Royer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1082 days.

(21) Appl. No.: 12/135,876

(22) Filed: Jun. 9, 2008

(65) Prior Publication Data

US 2009/0307688 A1    Dec. 10, 2009

(51) Int. Cl.
G06F 9/455    (2006.01)
(52) U.S. Cl. .......................................................... 718/1
(58) Field of Classification Search .................. 718/1
See application file for complete search history.

(56) References Cited

U.S. PATENT DOCUMENTS

| | | | | |
|---|---|---|---|---|
| 7,164,678 | B2 * | 1/2007 | Connor | 370/392 |
| 7,318,142 | B2 | 1/2008 | Accapadi et al. | |
| 7,483,998 | B2 * | 1/2009 | Rabinovitch | 709/238 |
| 7,783,779 | B1 * | 8/2010 | Scales et al. | 709/240 |
| 7,793,139 | B2 | 9/2010 | Jain et al. | |
| 2005/0204357 | A1 | 9/2005 | Garg et al. | |
| 2007/0106986 | A1 | 5/2007 | Worley, Jr. | |
| 2007/0150695 | A1 | 6/2007 | Kim et al. | |
| 2008/0040572 | A1 | 2/2008 | Hsu et al. | |
| 2008/0104152 | A1 | 5/2008 | Stephens et al. | |
| 2008/0104358 | A1 | 5/2008 | Noel et al. | |
| 2008/0140824 | A1 | 6/2008 | Jain et al. | |
| 2008/0155553 | A1 | 6/2008 | Astigarraga et al. | |
| 2008/0163196 | A1 | 7/2008 | Gimpl et al. | |

OTHER PUBLICATIONS

"i5/OS V6R1 Virtual Client Partitions VIOS, Blades and DS4000 Storage—IBM Power Systems", IBM Corporation, 2008, pp. 1-50.

\* cited by examiner

*Primary Examiner* — Jennifer To
*Assistant Examiner* — Eric C Wai
(74) *Attorney, Agent, or Firm* — Yee & Associates, P.C.; Libby Z. Toub

(57) ABSTRACT

An interface is provided between a virtual cluster proxy and a virtual I/O server on a logical partitioned platform. The virtual I/O server is configured to support virtual real memory. A command is received from a virtual cluster proxy. The virtual cluster proxy identifies whether the command is a virtual real memory command or a virtualization command. Virtual real memory commands and virtualization commands are marked by the virtual cluster proxy with a virtualization marker. The virtualization marker indicates that the command is a virtual real memory command or a virtualization command. The command is then forwarded to a logical partitioned platform. A virtual memory manager intercepts the command and identifies whether the command has been marked with the virtualization marker. If the command is marked with the virtualization marker, the virtual memory manager reroutes the command to the virtual I/O server.

25 Claims, 12 Drawing Sheets

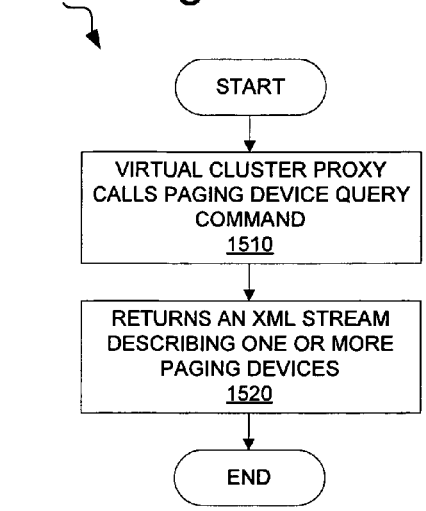
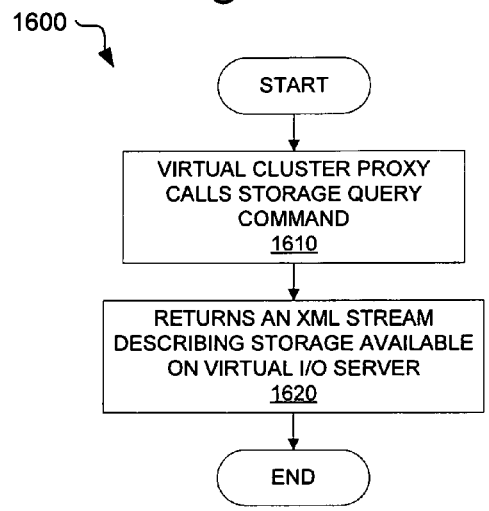
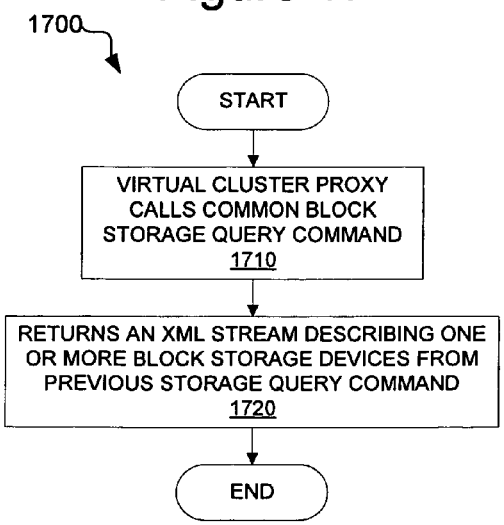

VIRTUAL CLUSTER PROXY TO VIRTUAL I/O SERVER MANAGER INTERFACE

BACKGROUND OF THE INVENTION

1. Field of the Invention

The present invention relates generally to a computer implemented method, a computer program product and a data processing system. More specifically, the present invention relates to a computer implemented method, a computer program product and a data processing system for providing an interface to facilitate virtual real memory services.

2. Description of the Related Art

Increasingly large symmetric multi-processor data processing systems are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platforms resources. These platform allocable resources include one or more architecturally distinct processors and their interrupt management area, regions of system memory, and input/output (I/O) adapter bus slots. The partition's resources are represented by the platform's firmware to the operating system image.

Each distinct operating system or image of an operating system running within a platform is protected from the other, such that software errors on one logical partition cannot affect the correct operation of any of the other partitions. This protection is provided by allocating a disjointed set of platform resources to be directly managed by each operating system image and by providing mechanisms for ensuring that the various images cannot control any resources that have not been allocated to that image. Furthermore, software errors in the control of an operating system's allocated resources are prevented from affecting the resources of any other image. Thus, each image of the operating system or each different operating system directly controls a distinct set of allocable resources within the platform.

With respect to hardware resources in a logical partitioned data processing system, these resources are shared dis-jointly among various partitions. These resources may include, for example, input/output (I/O) adapters, memory DIMMs, non-volatile random access memory (NVRAM), and hard disk drives. Each partition within a logical partitioned data processing system may be booted and shut down over and over without having to power-cycle the entire data processing system.

BRIEF SUMMARY OF THE INVENTION

According to one embodiment of the present invention, a computer implemented method, a computer program product, and a data processing system provide an interface between a virtual cluster proxy and a virtual I/O server on a logical partitioned platform. The virtual I/O server is configured to support virtual real memory. A command is received at a virtual cluster proxy. The virtual cluster proxy identifies whether the command is a virtual real memory command or a virtualization command. Virtual real memory commands and virtualization commands are marked by the virtual cluster proxy with a virtualization marker. The virtualization marker indicates that the command is a virtual real memory command or a virtualization command. The command is then forwarded to a logical partitioned platform. A virtual memory manager intercepts the command and identifies whether the command has been marked with the virtualization marker. If the command is marked with the virtualization marker, the virtual memory manager reroutes the command to the virtual I/O server.

BRIEF DESCRIPTION OF THE SEVERAL VIEWS OF THE DRAWINGS

FIG. 15 is a flowchart of the processing steps of a paging device query command according to an illustrative embodiment;

FIG. 16 is a flowchart of the processing steps of a storage query command according to an illustrative embodiment; and FIG. 17 is a flowchart of the processing steps of a common block storage query command according to an illustrative embodiment.

DETAILED DESCRIPTION OF THE INVENTION

Figure 1:
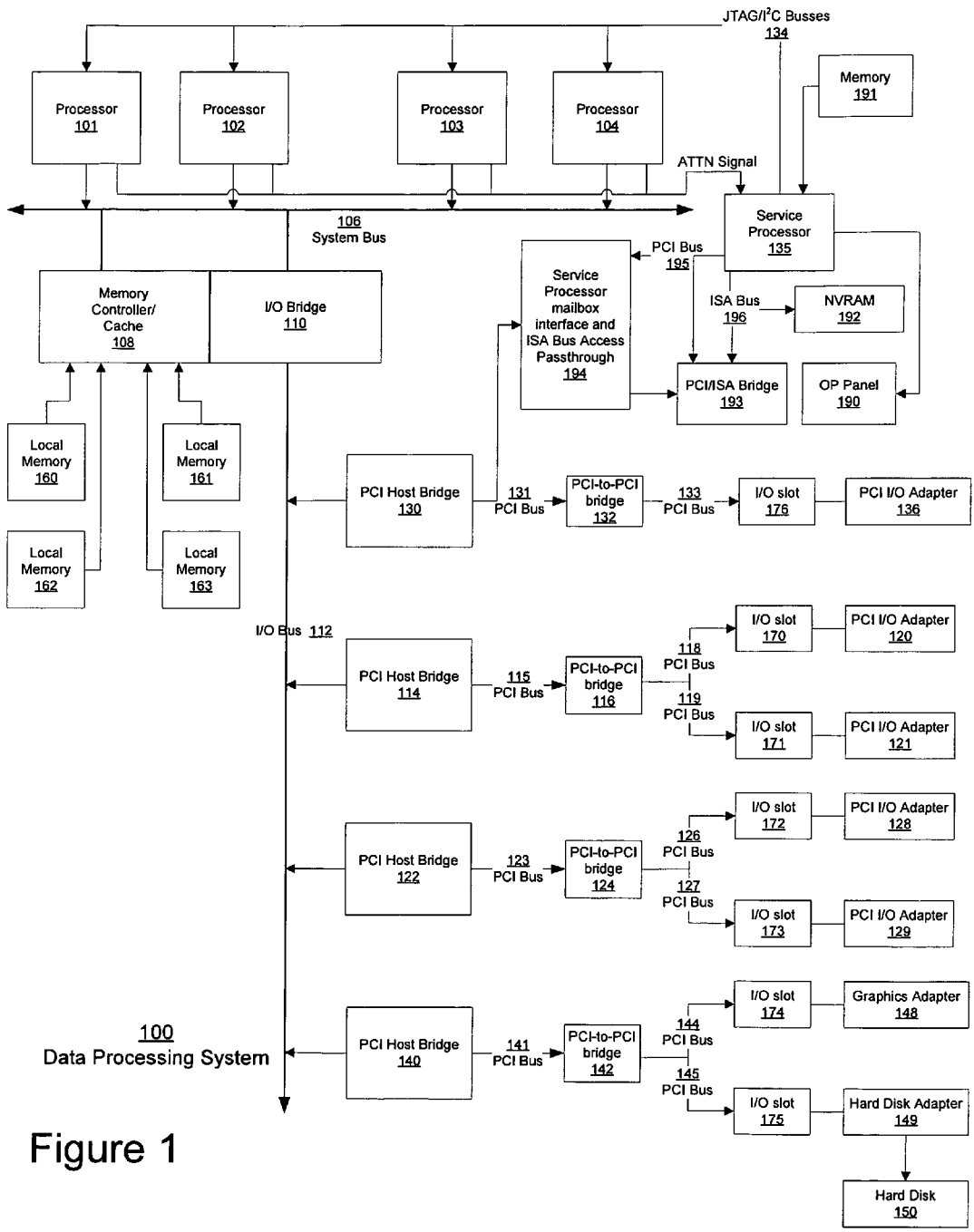
FIG. 1 is a block diagram of a data processing system in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, and in particular with reference to FIG. 1, a block diagram of a data processing system in which illustrative embodiments may be implemented is depicted. Data processing system 100 may be a symmetric multiprocessor (SMP) system including processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to local memories 160, 161, 162, and 163. I/O bridge 110 connects to system bus 106 and provides an interface to I/O bus 112. Memory controller/cache 108 and I/O bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120, 121, 128, 129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120, 121, 128, 129, and 136, graphics adapter 148, hard disk adapter 149, each of host processors 101, 102, 103, and 104, and memory from local memories 160, 161, 162, and 163 is assigned to each of the three partitions. In these examples, memories 160, 161, 162, and 163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160, 161, 162, and 163, and I/O adapters 120, 128, and 129 may be assigned to logical partition P1; processors 102 and 103, some portion of memory from local memories 160, 161, 162, and 163, and PCI I/O adapters 121 and 136 may be assigned to partition P2; and processor 104, some portion of memory from local memories 160, 161, 162, and 163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. PCI I/O adapters 120 and 121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128 and 129. PCI I/O adapters 128 and 129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

PCI host bridge 130 provides an interface for PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through 194 and PCI-to-PCI bridge 132. Service processor mailbox interface and ISA bus access pass-through 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101, 102, 103, and 104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I²C busses 134 to interrogate the system (host) processors 101, 102, 103, and 104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101, 102, 103, and 104, memory controller/cache 108, and I/O bridge 110. Any error information for failures detected during the BISTs, BATs, and memory tests are gathered and reported by service processor 135.

If a meaningful and valid configuration of system resources is still possible after taking out the elements found to be faulty during the BISTs, BATs, and memory tests, then data processing system 100 is allowed to proceed to load executable code into local (host) memories 160, 161, 162, and 163. Service processor 135 then releases host processors 101, 102, 103, and 104 for execution of the code loaded into local memory 160, 161, 162, and 163. While host processors 101, 102, 103, and 104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101, 102, 103, and 104, local memories 160, 161, 162, and 163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to illustrative embodiments.

Figure 2:
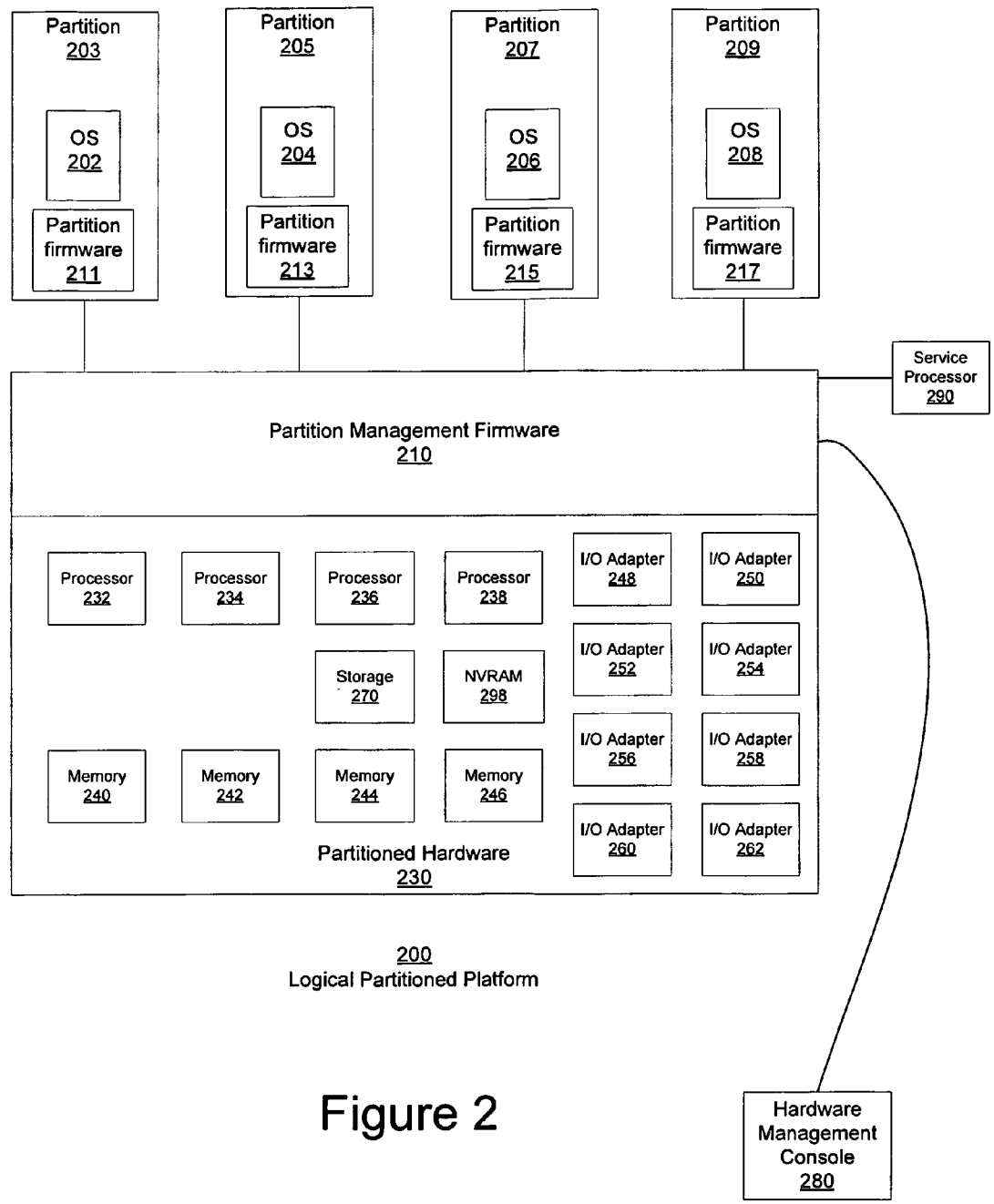
FIG. 2 is a block diagram of an exemplary logical partitioned platform in which illustrative embodiments may be implemented.

With reference now to FIG. 2, a block diagram of an exemplary logical partitioned platform is depicted in which illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor, which is available from International Business Machines Corporation. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes processors 232, 234, 236, and 238, memories 240, 242, 244, and 246, input/output (I/O) adapters 248, 250, 252, 254, 256, 258, 260, and 262, and a storage unit 270. Each of processors 232, 234, 236, and 238, memories 240, 242, 244, and 246, NVRAM storage 298, and I/O adapters 248, 250, 252, 254, 256, 258, 260, and 262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The present invention provides an interface between a virtual I/O server, (VIOS) and a virtual cluster proxy, or VCP, for facilitating virtual real memory allocation. The virtual I/O server executes within a logical partition, such as one of partitions 203, 205, 207, and 209 of FIG. 2. The virtual cluster proxy provides virtualization management, and can be a separate data processing system such as hardware management console 280 of FIG. 2. Similarly, the virtual cluster proxy can be an integrated virtualization manager executing within a logical partition, such as one of partitions 203, 205, 207, and 209 of FIG. 2.

The present invention provides a computer implemented method, a computer program product, and a data processing system provide an interface between a virtual cluster proxy and a virtual I/O server on a logical partitioned platform. The virtual I/O server is configured to support virtual real memory. A command is received from a virtual cluster proxy. The virtual cluster proxy identifies whether the command is a virtual real memory command or a virtualization command. Virtual real memory commands and virtualization commands are marked by the virtual cluster proxy with a virtualization marker. The virtualization marker indicates that the command is a virtual real memory command or a virtualization command. The command is then forwarded to a logical partitioned platform. A virtual memory manager intercepts the command and identifies whether the command has been marked with the virtualization marker. If the command is marked with the virtualization marker, the virtual memory manager reroutes the command to the virtual I/O server.

Figure 3:
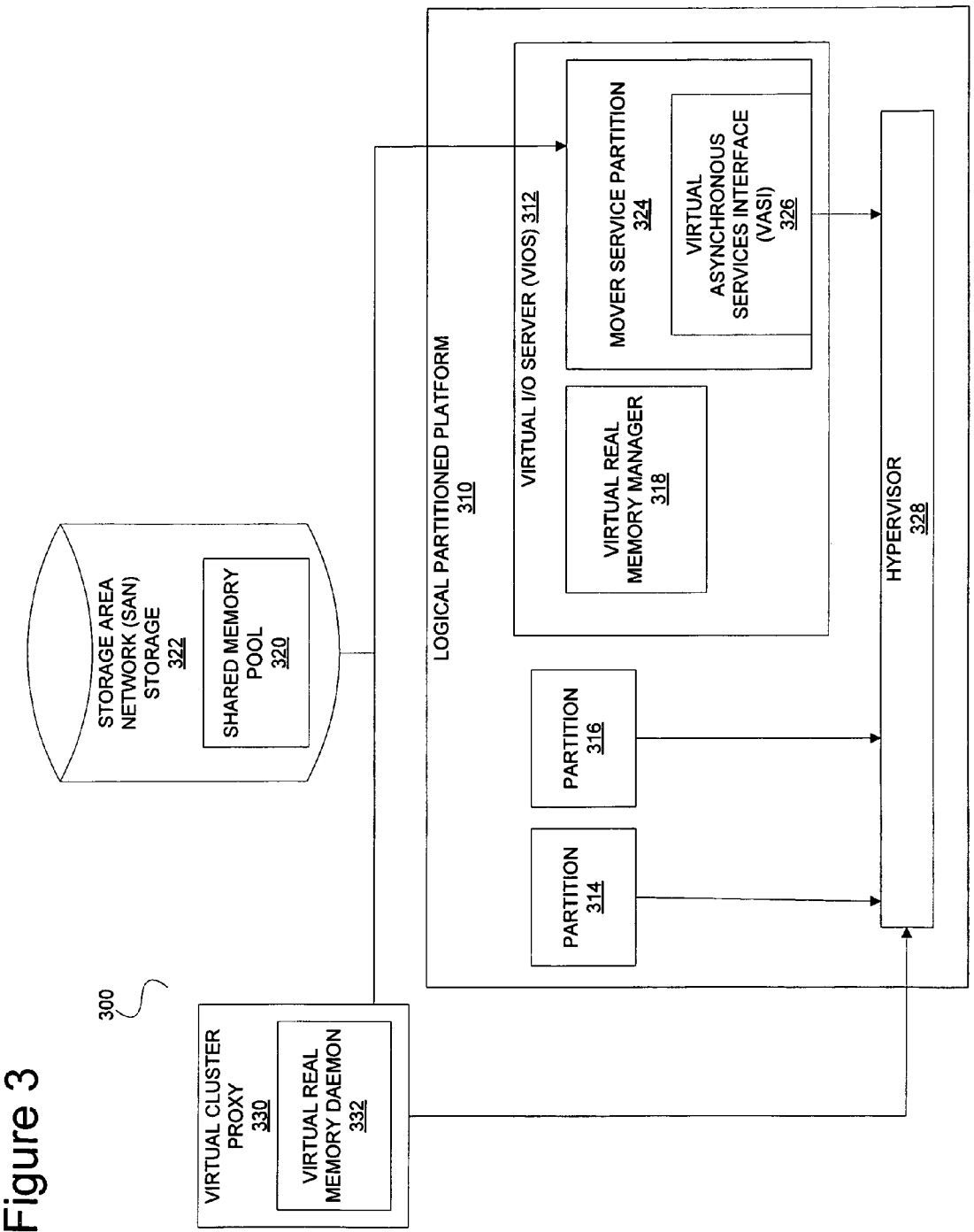
FIG. 3 is a virtualization management architecture providing virtual real memory according to a preferred embodiment.

Referring now to FIG. 3, a virtualization management architecture providing virtual real memory is shown according to a preferred embodiment. Integrated virtualization manager architecture 300 provides an interface for the management of shared virtual memory among virtual partitions, such as one of partitions 203, 205, 207, and 209 of FIG. 2.

Logical partitioned platform 310 is a partitioned data processing system such as logical partitioned platform 200 of FIG. 2. Virtual I/O Server 312, or VIOS, is software that is located within a logical partition, such as one of partitions 203, 205, 207, and 209 of FIG. 2, of logical partitioned platform 310. Virtual I/O Server 312 facilitates the sharing of physical I/O resources between client logical partitions, such as partition 314 and partition 316, within logical partitioned platform 310. Virtual I/O Server 312 provides virtual small computer system interface (SCSI) target and Shared Ethernet Adapter capability to client logical partitions within a logical partitioned platform, such as logical partitioned platform 200 of FIG. 2. Virtual I/O Server 312 allows partition 314 and partition 316 to share small computer system interface devices and Ethernet adapters. Virtual I/O Server 312 is a partition supporting Virtual Real Memory.

Virtual Real Memory allows a user to over commit the memory in a server running logical partitions. The user can create a shared memory pool and choose partitions that can use the memory in that shared pool. A virtual real memory manager software manages the shared memory pool in a secure manner. Operating systems running in partitions belonging to the shared memory pool may have less physical memory available to them than reported by firmware. The partitions may be using memory for some period of time in the shared pool to which the partitions have been granted access to by the virtual real memory manager. The virtual real memory manager may have to make space in the shared memory pool, and pages memory out of the shared memory pool. If memory paging occurs, the virtual real memory manager uses services of Virtual I/O Server 310 to write the memory to block storage.

Page faults from a partition, such as partitions 314 and 316, are intercepted by the virtual real memory manager. If the fault is for memory paged out of the shared pool, the virtual real memory manager pages the memory back into the shared pool using services of Virtual I/O Server 312. In the majority of operating circumstances, the virtual real memory manager can manage the shared memory pool so that paging in or out from a block storage device is rarely necessary.

Virtual real memory manager 318 is a software process executing on Virtual I/O server 312. Virtual real memory manager 318 manages the shared memory pool 320 in Storage area network (SAN) storage 322. Virtual real memory manager 318 pages memory from shared memory pool 320 to a partition, such as partitions 314 and 316. Virtual real memory manager 318 also pages memory back into shared memory pool 320 in response to a page fault from one of the partitions.

Mover service partition 324 (MSP) is a new attribute Virtual I/O Server 312. Mover service partition 324 asynchronously extracts, transports, and installs partition state. Virtual asynchronous services interface 326 (VASI) allows the Virtual I/O Server 312 to communicate with hypervisor 328, which is partition management firmware 210. Mover service partition 324 utilizes Virtual asynchronous services interface 326 to enable active partition migration and virtual real memory.

Virtual cluster proxy 330 provides virtualization management. Virtual cluster proxy 330 can be a separate data processing system such as hardware management console 280 of FIG. 2. Similarly, the virtual cluster proxy can be an integrated virtualization manager executing within a logical partition, such as one of partitions 203, 205, 207, and 209 of FIG. 2.

Virtual real memory daemon 332 is a software component which handles periodic service requests that a computer system expects to receive. The daemon program forwards virtual real memory commands and requests to virtual I/O server 310. These virtual real memory commands are specific to the flows between the virtual cluster proxy 330 and virtual I/O server 310.

Figure 4:
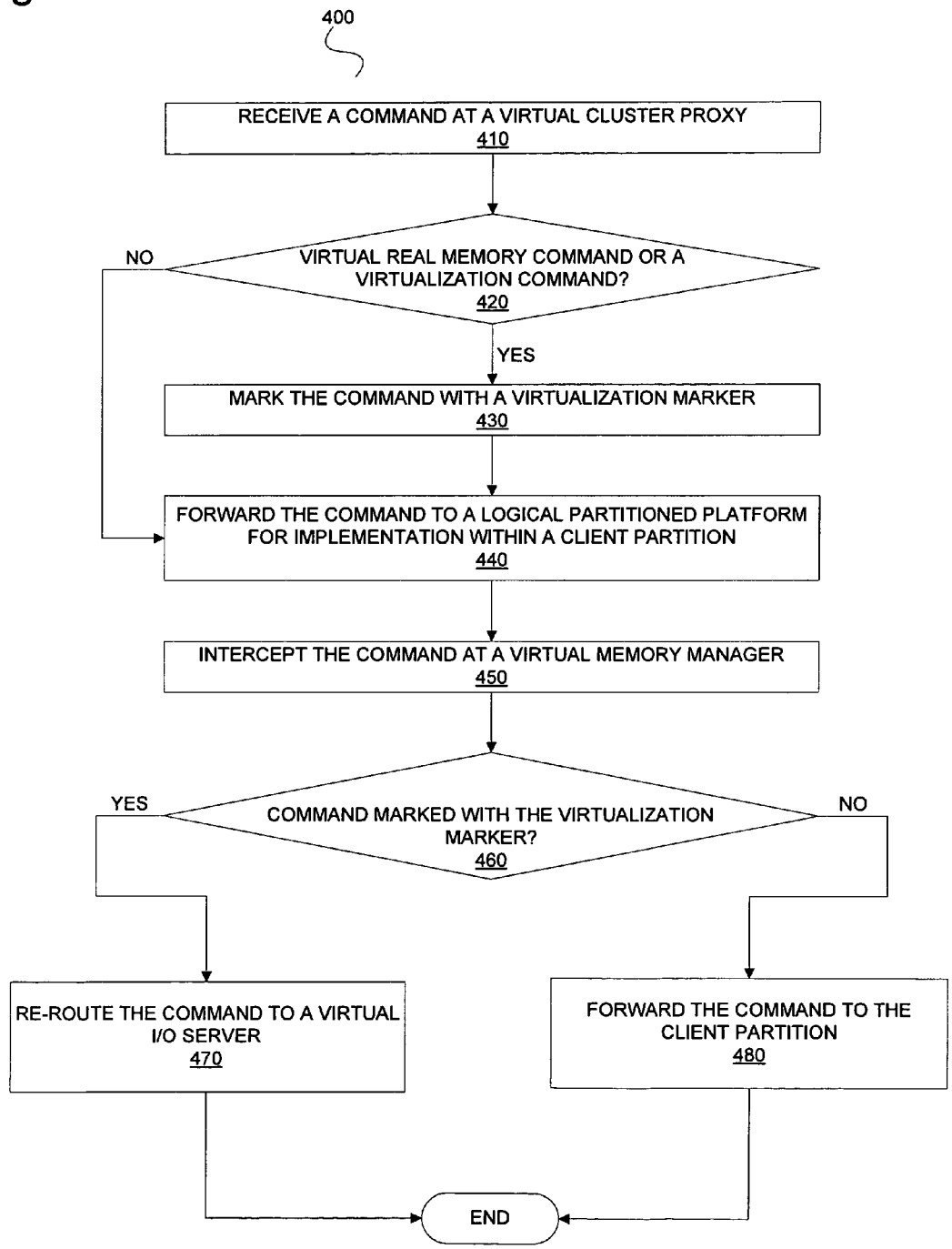
FIG. 4 is a flowchart of high level interface between a virtual cluster proxy and a virtual I/O server on a logical partitioned platform according to an illustrative embodiment.

Referring now to FIG. 4, a flowchart of high level interface between a virtual cluster proxy and a virtual I/O server on a logical partitioned platform is shown according to an illustrative embodiment. Process 400 is a software process executing on the various software components of Integrated Virtualization Manager Architecture 300.

Process 400 begins by receiving a command at a virtual cluster proxy (step 410). The process then identifies whether the command is one of a virtual real memory command or a virtualization command (step 420). The command is one of a virtual real memory command or a virtualization command if it invokes processes on a virtual I/O server that is configured to support virtual real memory.

Responsive to process 400 identifying that the command is one of a virtual real memory command or a virtualization command ("yes" at step 420), process 400 marks the command with a virtualization marker, wherein the virtualization marker indicates that the command is a virtual real memory command or a virtualization command. The marker can be any way of distinguishing the command as being a virtual real memory command or a virtualization command, such as setting a flag. In one illustrative example, the command is a command from a command line interface of the virtual cluster proxy. The marker can then be a designated prefix that is affixed to the text of the command.

Returning now to step 420, responsive to process 400 not identifying that the command is one of a virtual real memory command or a virtualization command ("no" at step 420), process 400 does not mark the command with a virtualization marker, wherein the virtualization marker indicates that the command is a virtual real memory command or a virtualization command. Process 400 instead proceeds to step 440 without marking the command.

Process 400 then forwards the command to a logical partitioned platform for implementation within a client partition, such as partition (step 440). The logical partitioned platform can be logical partitioned platform 310 of FIG. 3. The client partition is a partition such as one of client partitions 314 and 316 of FIG. 3.

Process 400 then intercepts the command at a virtual memory manager (step 450), to identify whether the command has been marked with the virtualization marker (step 460). The virtual memory manager can be virtual memory manger 318 of FIG. 3. The virtual memory manager can identify whether the command has been marked with the virtualization marker by parsing the command to see if the command contains the virtualization marker. In one illustrative embodiment, the virtual memory manager parses the command to determine the existence of the prefix appended to the command in step 430.

Responsive to process 400 identifying that the command has been marked with the virtualization marker ("yes" at step 460), the command is then re-routed to a virtual I/O server (step 470), with the process terminating thereafter. The virtual I/O server is configured to support virtual real memory, and can be virtual I/O server 312 of FIG. 3.

Returning now to step 460, responsive to process 400 not identifying that the command has been marked with the virtualization marker, process 400 forwards the command to the client partition (step 480), with the process terminating thereafter.

Referring now to FIGS. 5 through 17, various virtual real memory commands and virtualization commands that provide an interface between a virtual cluster proxy and a virtual I/O server on a logical partitioned platform are shown according to an illustrative embodiment.

Some commands as shown in FIGS. 5 through 17 may write an XML data stream to a pipe. Other commands as shown in FIGS. 5 through 17 may read an XML data stream from a pipe. The pipe is established by a command manager. Commands that write or read a data stream also support the redirecting of the data stream to a file. In one illustrative embodiment, commands that write an XML data stream enclose the data stream in the tags, allowing a parser to easily detect a corrupted data stream.

Figure 5:
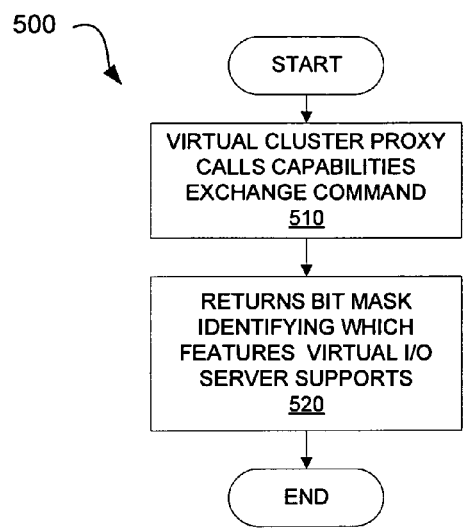
FIG. 5 is a flowchart of the processing steps of a capabilities exchange command according to an illustrative embodiment.

Referring now to FIG. 5, a flowchart of the processing steps of a capabilities exchange command is shown according to an illustrative embodiment. The capabilities exchange command is a command called by a virtual cluster proxy, such as virtual cluster proxy 330 of FIG. 3.

Process 500 begins by a virtual cluster proxy calling the capabilities exchange command (step 510). The capabilities exchange command identifies what features are supported by a particular virtual I/O server, such as virtual I/O server 312 of FIG. 3. The capabilities exchange command does not supersede a current command supported by the migration manager.

Responsive to calling the capabilities exchange command, process 500 returns bit mask identifying which features the virtual I/O server supports (step 520), with the process terminating thereafter. In one illustrative embodiment, the command is an ASCII string representation that can identify whether the virtual I/O server supports any of live migration, virtual real memory, or N_Port ID Virtualization.

Figure 6:
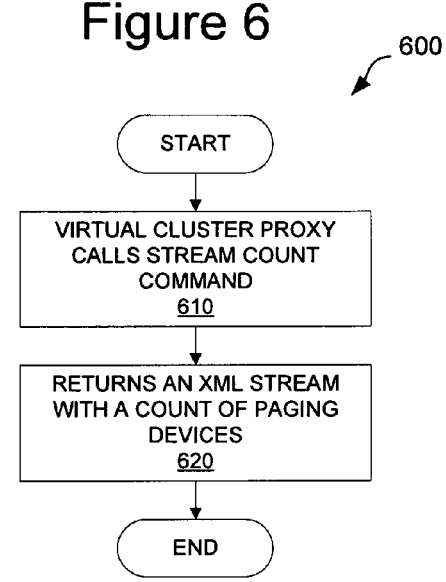
FIG. 6 is a flowchart of the processing steps of a stream count command according to an illustrative embodiment.

Referring now to FIG. 6, a flowchart of the processing steps of a stream count command is shown according to an illustrative embodiment. The stream count command is a command called by a virtual cluster proxy, such as virtual cluster proxy 330 of FIG. 3.

Process 600 begins by a virtual cluster proxy calling the stream count command (step 610). The stream count command is called by the virtual cluster proxy to identify the number of paging devices that are using a Virtual asynchronous services interface, such as Virtual asynchronous services interface 326 of FIG. 3.

Responsive to calling the stream count command, process 600 returns an XML stream with a count of the paging devices (step 620), with the process terminating thereafter. The count is an identification of every paging device bound to the Virtual asynchronous services interface device, such as Storage area network storage 322 of FIG. 3. The count includes every paging device bound to the Virtual asynchronous services interface device, regardless of whether the paging device supports virtual real memory.

Figure 7:
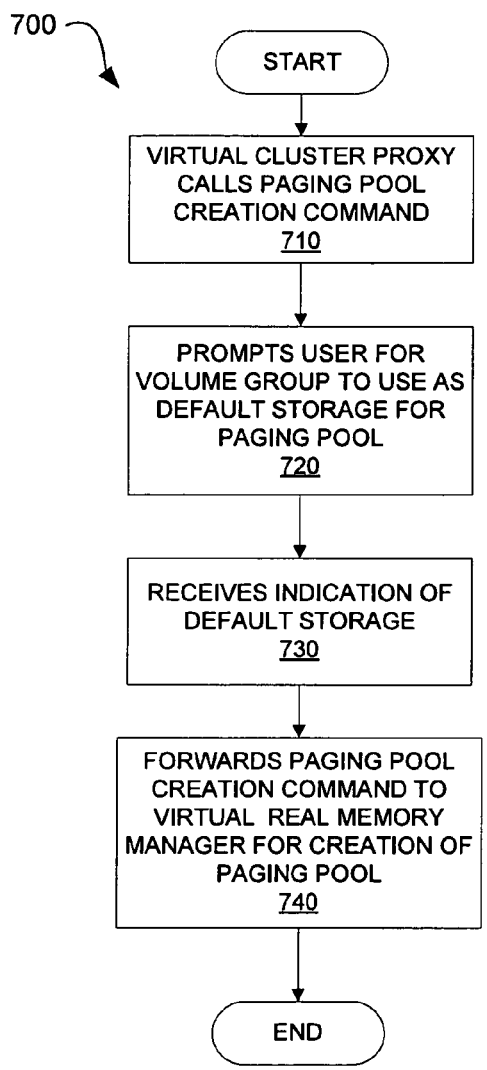
FIG. 7 is a flowchart of the processing steps of a paging pool creation command according to an illustrative embodiment.

Referring now to FIG. 7, a flowchart of the processing steps of a paging pool creation command is shown according to an illustrative embodiment. The paging pool creation command is a command called by a virtual cluster proxy, such as virtual cluster proxy 330 of FIG. 3.

Process 700 begins by a virtual cluster proxy calling the paging pool creation command (step 710). The paging pool creation command is called by the virtual cluster proxy to create a new paging pool, such as storage pool 320 of FIG. 3.

Responsive to calling the paging pool creation command, process 700 prompts a user for which, if any, volume group to use as default storage for this paging pool (step 720). Process 700 can then receive the indication of the default storage (step 730). Therefore, the call can specify a volume group identifier for a particular storage device that a user chooses as default storage for paging devices created for the new paging pool. The call may also not specify a particular storage device, if a default storage device is not desired.

Responsive to receiving an indication of which, if any, volume group to use as default storage for this paging pool, process 700 forwards the paging pool creation command to the virtual real memory manager for creation of the paging pool (step 740), with the process terminating thereafter.

Figure 8:
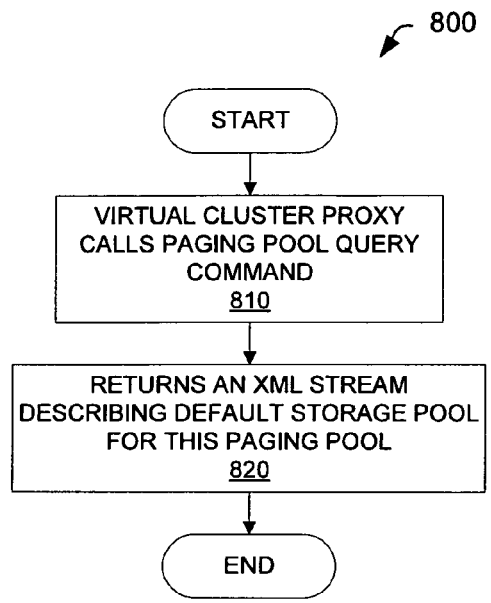
FIG. 8 is a flowchart of the processing steps of a paging pool query command according to an illustrative embodiment.

Referring now to FIG. 8, a flowchart of the processing steps of a paging pool query command is shown according to an illustrative embodiment. The paging pool query command is a command called by a virtual cluster proxy, such as virtual cluster proxy 330 of FIG. 3.

Process 800 begins by a virtual cluster proxy calling the paging pool query command (step 610). The paging pool query command is called by the virtual cluster proxy to describe the default storage pool for this paging pool. The default paging pool is volume group identified, if any, as the default storage for this paging pool in step 720 of FIG. 7.

Responsive to calling the paging pool query command, process 800 returns an XML stream describing the default storage pool for this paging pool (step 620), with the process terminating thereafter. If the pool was created without a default storage pool, then the returned XML stream is an empty list.

Figure 9:
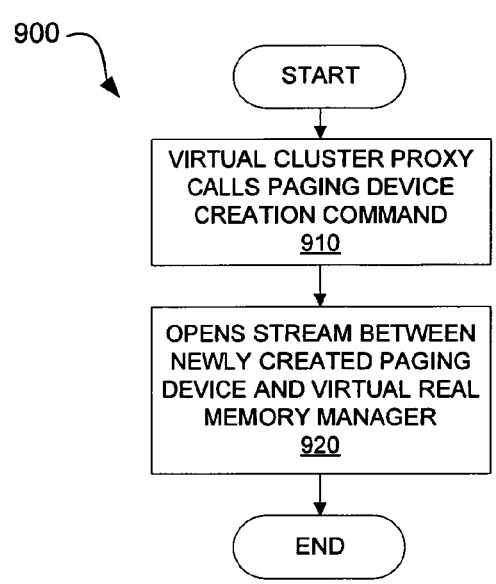
FIG. 9 is a flowchart of the processing steps of a paging device creation command according to an illustrative embodiment.

Referring now to FIG. 9, a flowchart of the processing steps of a paging device creation command is shown according to an illustrative embodiment. The paging device creation command is a command called by a virtual cluster proxy, such as virtual cluster proxy 330 of FIG. 3.

Process 900 begins by a virtual cluster proxy calling the paging device creation command (step 910). The paging device creation command is called by the virtual cluster proxy to create a new paging device, such as Shared memory pool 320 of FIG. 3. The paging device creation command supports identifying a block storage device, such as Storage area network storage 322 of FIG. 3, to be mapped to a stream. The paging device creation command also supports allocating storage from a logical device that exists on a virtual I/O server, such as virtual I/O server 312 of FIG. 3. The paging device creation command will include parameters such as, for example, but not limited to, the type of logical storage device from which the paging device is created, the name of a block storage device from which the paging device is created, a volume group identifier, and the size of the minimal block storage needed to support the newly created paging device.

Responsive to calling the paging device creation command, a stream is opened between the newly created paging device and the virtual real memory manager (step 920), such as virtual real memory manager 318 of FIG. 3, with the process terminating thereafter.

Figure 10:
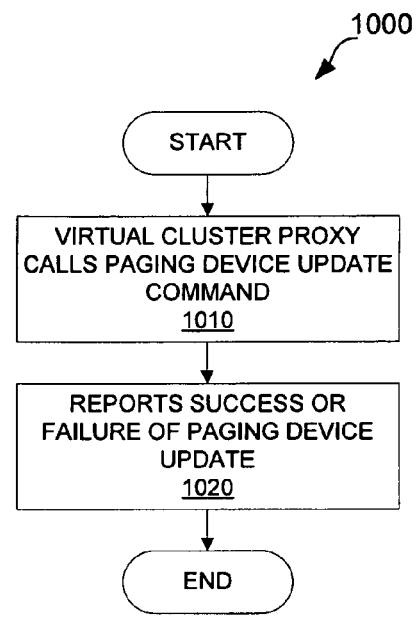
FIG. 10 is a flowchart of the processing steps of a paging device update command according to an illustrative embodiment.

Referring now to FIG. 10, a flowchart of the processing steps of a paging device update command is shown according to an illustrative embodiment. The paging device update command is a command called by a virtual cluster proxy, such as virtual cluster proxy 330 of FIG. 3.

Process 1000 begins by a virtual cluster proxy calling the paging device update command (step 1010). The paging device update command is called by the virtual cluster proxy to change the attributes of an existing paging device, such as Shared memory pool 320 of FIG. 3. The paging device update command can include changes to the name of a virtual asynchronous services device, such as Virtual asynchronous services device 326 of FIG. 3. The paging device update command can also include a disassociation of a paging device from any virtual asynchronous services device. The paging device update command can also include validation of an available virtual asynchronous services device or changing of any redundant attributes of the virtual real memory system.

The process then reports the success or failure of the paging device update (step 1020), with the process terminating thereafter. If the update was not successfully performed, process 1000 will return an appropriate error code at step 1020. If the update was successfully performed, process 1000 can return an XML stream confirming the successful update of the paging device.

Figure 11:
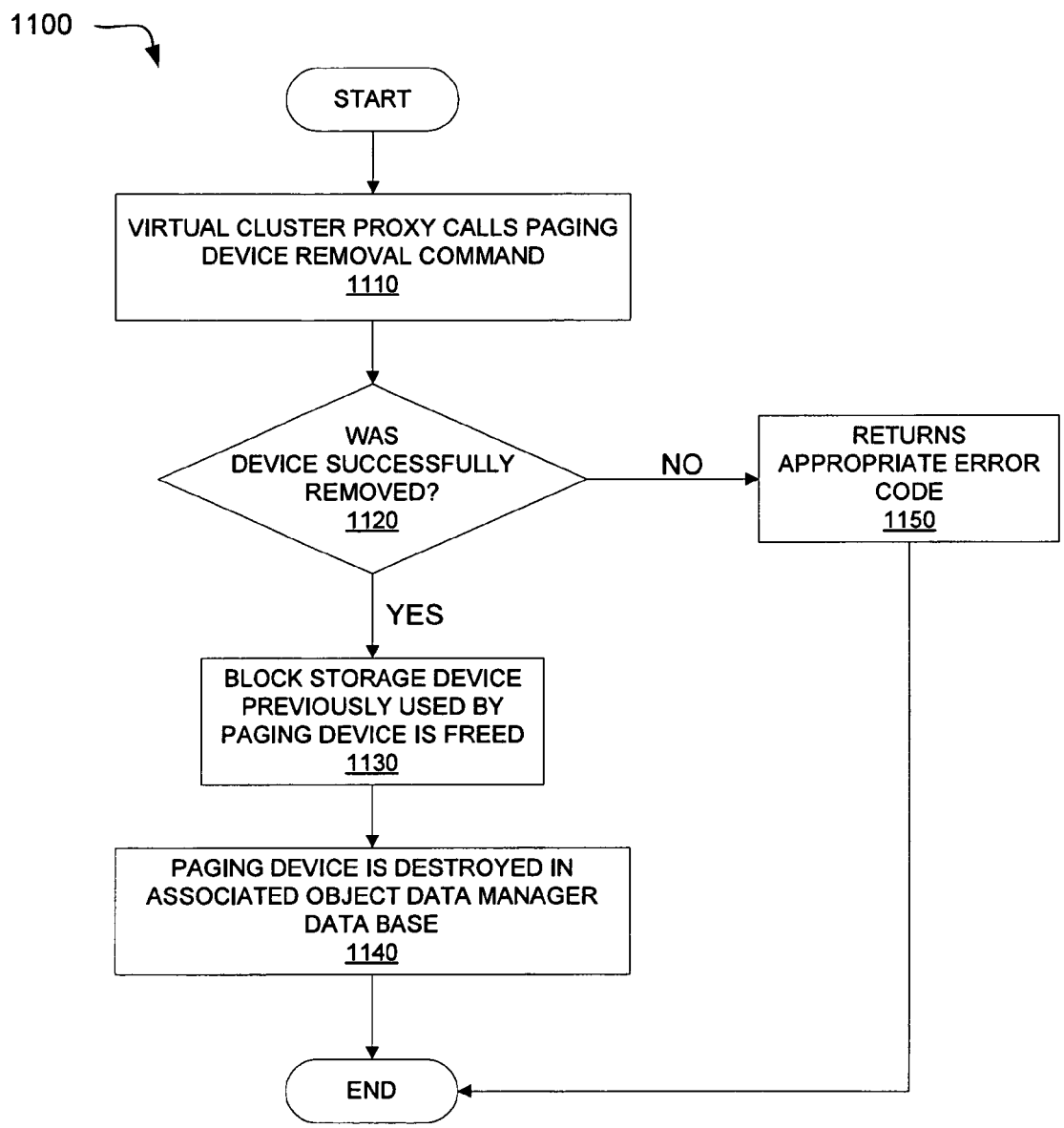
FIG. 11 is a flowchart of the processing steps of a paging device removal command according to an illustrative embodiment.

Referring now to FIG. 11, a flowchart of the processing steps of a paging device removal command is shown according to an illustrative embodiment. The paging device removal command is a command called by a virtual cluster proxy, such as virtual cluster proxy 330 of FIG. 3.

Process 1100 begins by a virtual cluster proxy calling the paging device removal command (step 1110). The paging device removal command is a command called by the virtual cluster proxy to remove an existing paging device, such as Shared memory pool 320 of FIG. 3.

Responsive to calling the paging device removal command, process 1100 identifies whether the device was successfully removed (step 1120). If the paging device was successfully removed ("yes" at step 1120), then the block storage device previously used by the paging device is freed (step 1130). The block storage device can then be utilized for some other purpose. The paging device is destroyed in an associated object data manager data base (step 1140), with the process terminating thereafter.

Returning now to step 1120, if the paging device was not successfully removed ("no" at step 1120), process 1100 can return an appropriate error code (step 1150), with the process terminating thereafter. In one illustrative embodiment, the appropriate error code can indicate, but is not limited to indicating, that the paging device to be destroyed was busy, or was not located.

Figure 12:
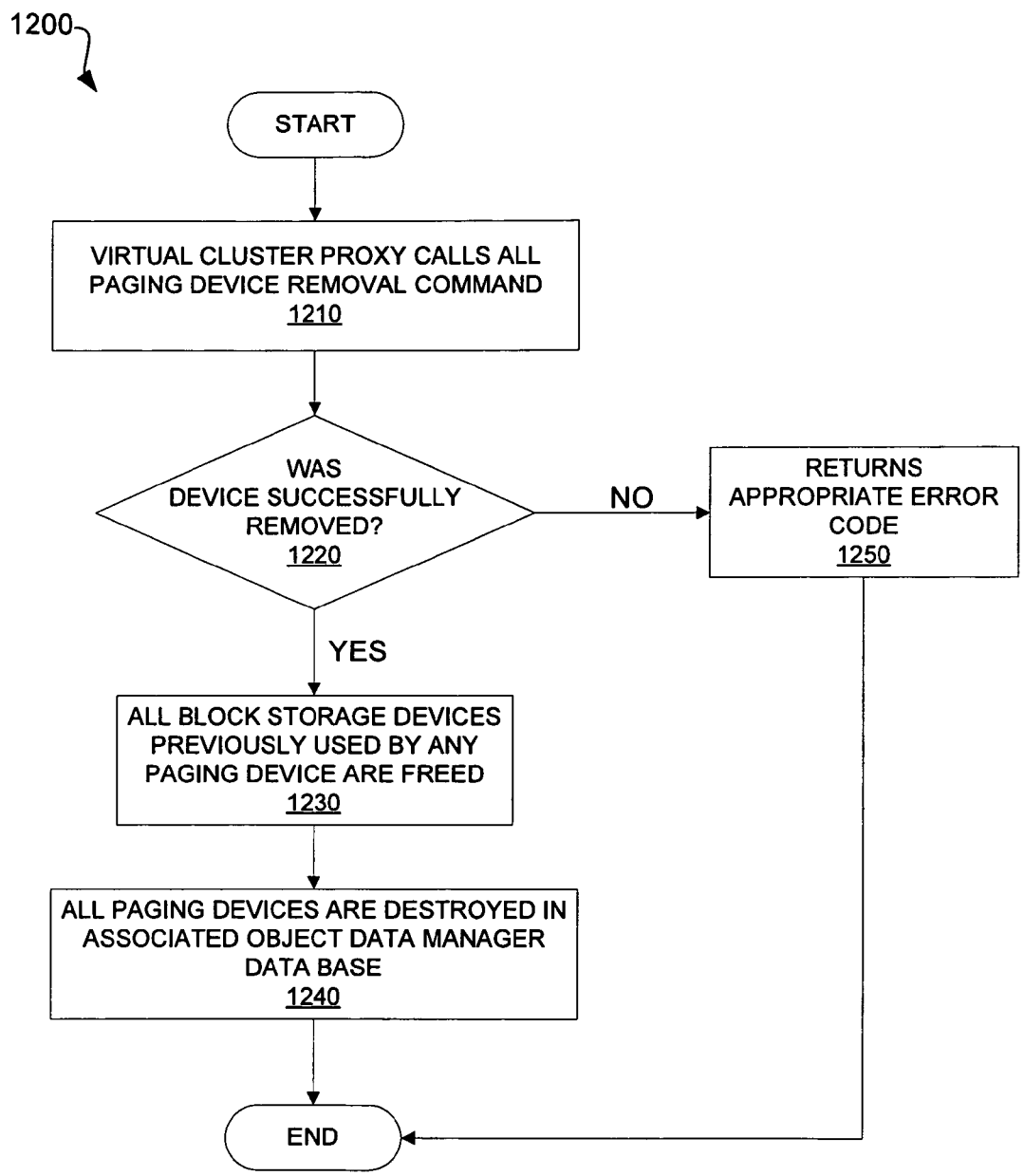
FIG. 12 is a flowchart of the processing steps of an all paging device removal command according to an illustrative embodiment.

Referring now to FIG. 12, a flowchart of the processing steps of an all paging device removal command is shown according to an illustrative embodiment. The all paging device removal command is a command called by a virtual cluster proxy, such as virtual cluster proxy 330 of FIG. 3. The all paging device removal command is similar to the paging device removal command of FIG. 11, however, if the all paging device removal command succeeds, no paging devices remain available.

Process 1200 begins by calling the all paging device removal command (step 1210). The all paging device removal command is a command called by the virtual cluster proxy to remove an existing paging device, such as Shared memory pool 320 of FIG. 3.

Responsive to calling the all paging device removal command, process 1200 identifies whether the device was successfully removed (step 1220). If the paging device was successfully removed ("yes" at step 1220), then all block storage devices previously used by any paging device are freed (step 1230). The block storage devices can then be utilized for some other purpose. All paging devices are destroyed in an associated object data manager data base (step 1240), with the process terminating thereafter.

Returning now to step 1220, if the paging device was not successfully removed ("no" at step 1220), process 1200 can return an appropriate error code (step 1250), with the process terminating thereafter. If the virtual I/O server detects a failure attempting to remove one paging device, the virtual I/O server will still attempt to remove all other paging devices in the pool. The virtual I/O server returns an XML object for each error encountered. If an error is encountered in attempting to close a paging device, the paging device remains available, and the stream is not closed. In one illustrative embodiment, the appropriate error code can indicate, but is not limited to indicating, that the paging device to be destroyed was busy, or was not located.

Figure 13:
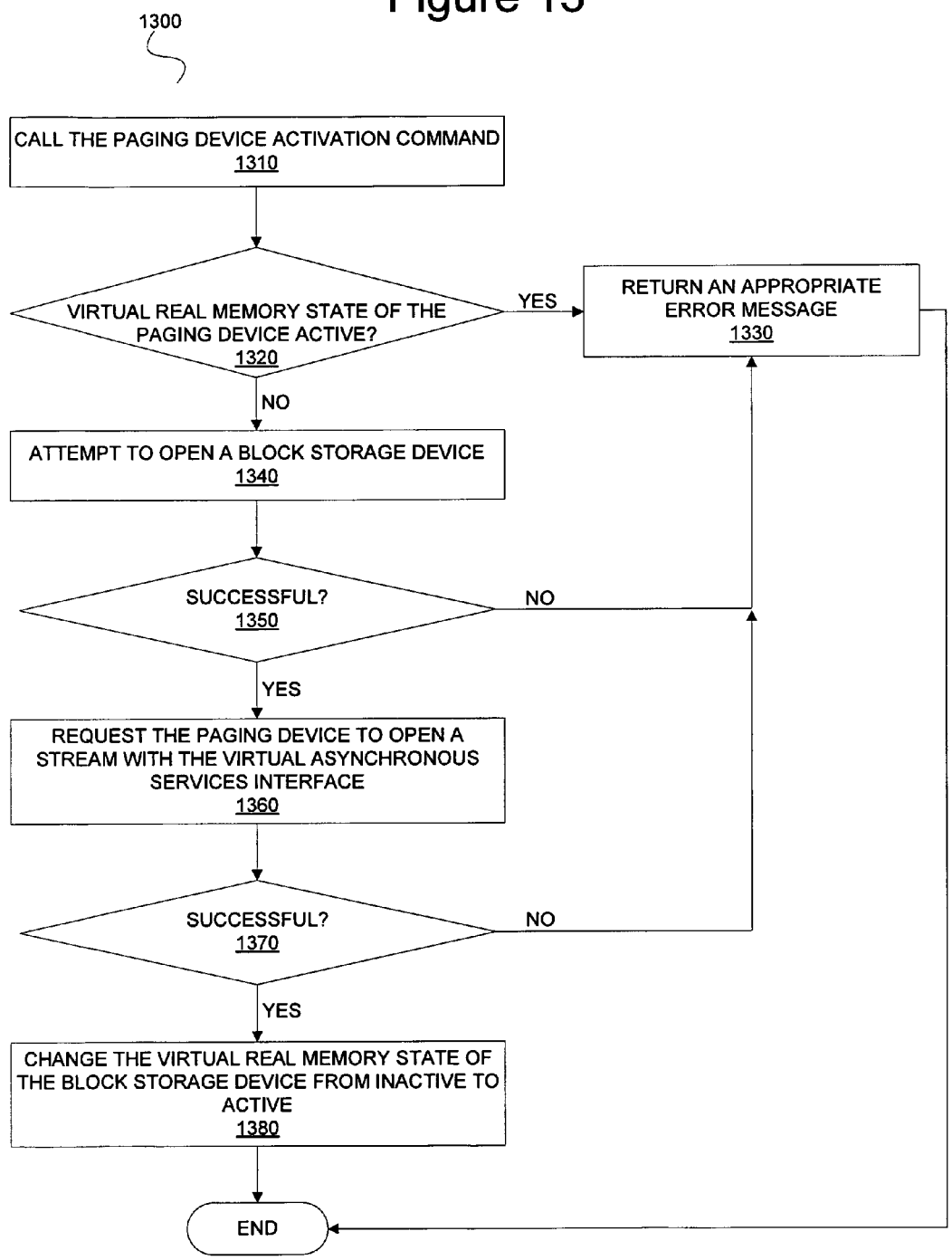
FIG. 13 is a flowchart of the processing steps of a paging device activation command according to an illustrative embodiment.

Referring now to FIG. 13, a flowchart of the processing steps of a paging device activation command is shown according to an illustrative embodiment. The paging device activation command is a command called by a virtual cluster proxy, such as virtual cluster proxy 330 of FIG. 3.

Process 1300 begins calling the paging device activation command (step 1310). The paging device activation command is a command called by the virtual cluster proxy to activate an existing paging device, such as Shared memory pool 320 of FIG. 3.

Responsive to calling the paging device activation command, process 1300 identifies whether the virtual real memory state of the paging device is active (step 1320). Responsive to process 1300 identifying that the virtual real memory state of the paging device is active ("yes" at step 1320), process 1300 returns an appropriate error message (step 1330), with the process terminating thereafter. Here, the appropriate error message may indicate that the paging device is active.

Responsive to not identifying that the virtual real memory state of the paging device is active ("no" at step 1320), process 1300 attempts to open a block storage device (step 1340), such as Storage area network storage 322 of FIG. 3. If process 1300 can not open the block storage device ("no" at step 1350), process 1300 returns an appropriate error message (step 1330), with the process terminating thereafter.

If process 1300 can open the block storage device ("yes" at step 1350), process 1300 then requests the paging device to open a stream with the Virtual asynchronous services interface (step 1360). The Virtual asynchronous services interface is Virtual asynchronous services interface 326 of FIG. 3. If process 1300 can not open a stream with the Virtual asynchronous services interface ("no" at step 1370), process 1300 returns an appropriate error message (step 1330), with the process terminating thereafter. Here, the appropriate error message may indicate a configuration problem with the virtual I/O server. Additionally, the appropriate error message may indicate an error when a virtual real memory manager attempts to open the stream between the paging device and the Virtual asynchronous services interface.

If process 1300 opens a stream with the Virtual asynchronous services interface ("yes" at step 1370), the command succeeds. Process 1300 changes the virtual real memory state of the block storage device from inactive to active (step 1380), with the process terminating thereafter.

Figure 14:
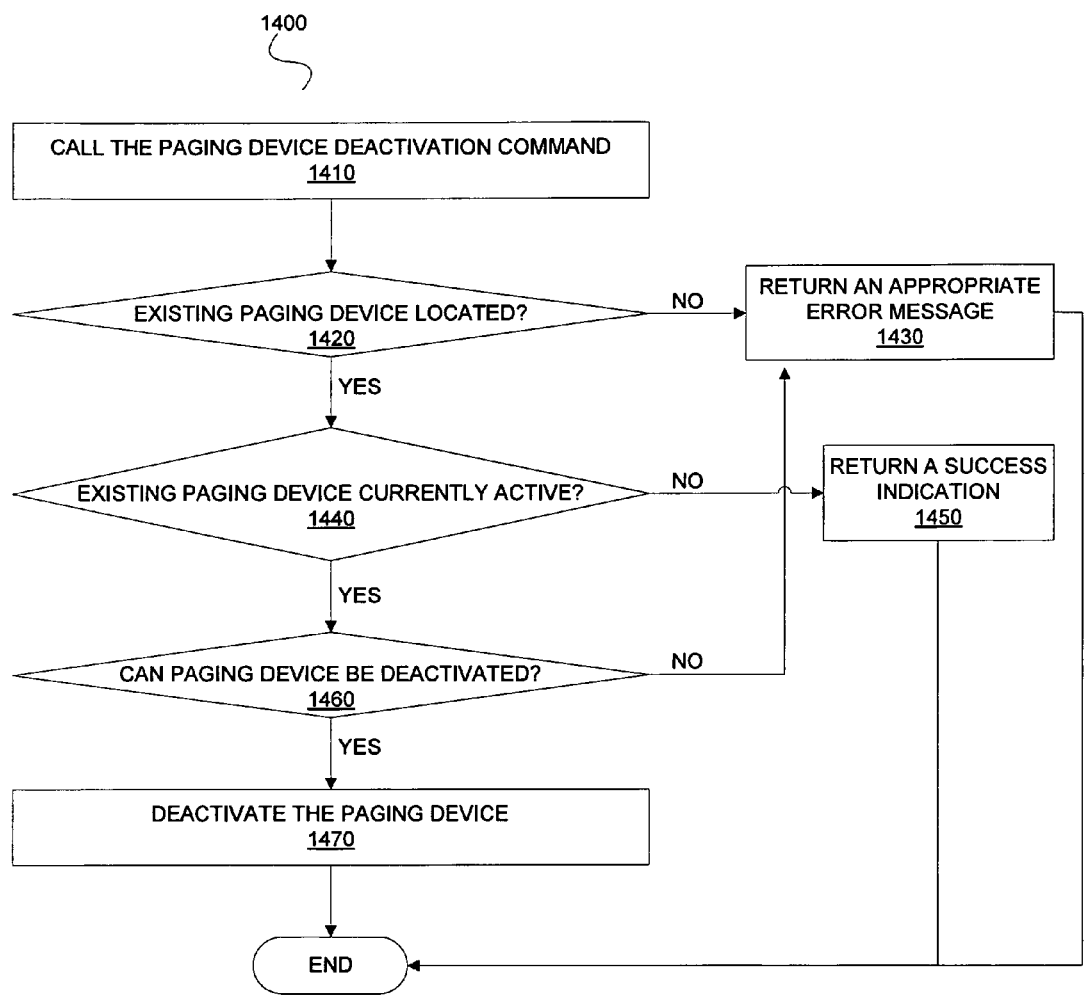
FIG. 14 is a flowchart of the processing steps of a paging device deactivation command according to an illustrative embodiment.

Referring now to FIG. 14, a flowchart of the processing steps of a paging device deactivation command is shown according to an illustrative embodiment. The paging device deactivation command is a command called by a virtual cluster proxy, such as virtual cluster proxy 330 of FIG. 3.

Process 1400 begins by calling the paging device deactivation command (step 1410). The paging device deactivation command is a command called by the virtual cluster proxy to deactivate an existing paging device, such as Shared memory pool 320 of FIG. 3.

Responsive to calling the paging device deactivation command, process 1400 attempts to identify the existing paging device (step 1420). Process 1400 can locate the existing paging device by locating an address for the device in an object database manager's data base. The object database manager is a component of the virtual real memory manager, such as virtual real memory manager 318 of FIG. 3. The object database manager tracks the status and location for the created paging devices.

Responsive to process 1400 not identifying the existing paging device ("no" at step 1420), process 1400 returns an appropriate error message (step 1430), with the process terminating thereafter. In the present case, an appropriate error message may be an indication that the virtual I/O server can not find the indicated paging device in its object database manager data base.

Responsive to process 1400 identifying the existing paging device ("yes" at step 1420), process 1400 identifies whether the existing paging device is currently active (step 1440). Responsive to not identifying that the existing paging device is currently active ("no" at step 1440), process 1400 returns a success indication (step 1450), with the process terminating thereafter. Because the existing paging device is already inactive, process 1400 need not take any additional action to deactivate the paging device.

Responsive to not identifying that the existing paging device is currently active ("yes" at step 1440), process 1400 determines whether the paging device can be deactivated (step 1460). A paging device can be deactivated when no memory pages are paged out to a partition. If the paging device cannot be deactivated ("no" at step 1460), process 1400 returns an appropriate error message (step 1430), with the process terminating thereafter. In the present case, an appropriate error message may be an indication that the paging device is busy.

Returning now to step 1460, responsive to process 1400 determining that the paging device can be deactivated ("yes" at step 1460), the paging device is deactivated (step 1470), with the process terminating thereafter. The virtual real memory state of the paging device is changed from active to inactive. The object database manager's data base is updated to indicate the inactive status of the paging device. The virtual I/O server implementing the virtual real memory is otherwise unchanged.

Referring now to FIG. 15, a flowchart of the processing steps of a paging device query command is shown according to an illustrative embodiment. The paging device query command is a command called by a virtual cluster proxy, such as virtual cluster proxy 330 of FIG. 3.

Process 1500 begins by a virtual cluster proxy calling the paging device query command (step 1510). The paging device query command is called by the virtual cluster proxy to identify information and status of active paging devices.

Responsive to calling the paging device query command, process 1500 returns an XML stream describing one or more paging devices (step 1520), with the process terminating thereafter. The XML data stream includes any shared pool identifiers, data stream identifiers, redundant usage attributes of the paging device(s), redundant capabilities of the paging device(s), virtual real memory states of the paging device(s), virtual I/O server states of the paging device(s), size of the paging device(s), names of the paging device(s) at the time of the call, location of the paging device(s), and the name of the paging device's Virtual asynchronous services interface device.

Referring now to FIG. 16, a flowchart of the processing steps of a storage query command is shown according to an illustrative embodiment. The storage query command is a command called by a virtual cluster proxy, such as virtual cluster proxy 330 of FIG. 3.

Process 1600 begins by a virtual cluster proxy calling the storage query command (step 1610). The storage query command is called by the virtual cluster proxy to identify storage available on the virtual I/O server that may be selected by the user for virtual real memory paging devices.

Responsive to calling the storage query command, process 1600 returns an XML stream describing storage available on the virtual I/O server that may be selected by the user for virtual real memory paging devices (step 1620), with the process terminating thereafter. The XML data stream can include, for example, but is not limited to the redundant capability of storage available on the virtual I/O server, the size of storage available on the virtual I/O server, a name of the storage available on the virtual I/O server at the time of the call, and a location for the storage available on the virtual I/O server. The parameters to the command may act as filters so that only descriptions of storage meeting the criteria are returned to the caller.

Referring now to FIG. 17, a flowchart of the processing steps of a common block storage query command is shown according to an illustrative embodiment. The common block storage query command is a command called by a virtual cluster proxy, such as virtual cluster proxy 330 of FIG. 3.

Process 1700 begins by a virtual cluster proxy calling the common block storage query command (step 1710). The common block storage query command is called by the virtual cluster proxy to identify any block storage devices that are accessible to the PSP executing the command.

Responsive to calling the common block storage query command, process 1700 returns an XML data stream describing one or more block storage devices from a previous storage query command, such as that described in FIG. 16, sent to a different paging space partition (step 1720), with the process terminating thereafter.

Thus, the present invention described herein provides an interface between a virtual I/O server, (VIOS) and a virtual cluster proxy, or VCP, for facilitating virtual real memory allocation. The virtual I/O server executes within a logical partition, such as one of partitions 203, 205, 207, and 209 of FIG. 2. The virtual cluster proxy provides virtualization management, and can be a separate data processing system such as hardware management console 280 of FIG. 2. Similarly, the virtual cluster proxy can be an integrated virtualization manager executing within a logical partition, such as one of partitions 203, 205, 207, and 209 of FIG. 2.

Virtual real memory allows a user to over commit the memory in a server running logical partitions. The user can create a shared memory pool and choose partitions that can use the memory in that shared pool. A virtual real memory manager software manages the shared memory pool in a secure manner. Operating systems running in partitions belonging to the shared memory pool may have less physical memory available to them than reported by firmware. The partitions may be using memory for some period of time in the shared pool to which the partitions have been granted access to by the virtual real memory manager. The virtual real memory manager may have to make space in the shared memory pool, and pages memory out of the shared memory pool. If memory paging occurs, the virtual real memory manager uses the services of Virtual I/O Server 312 of FIG. 3 to write the memory to block storage.

A computer implemented method, a computer program product, and a data processing system provide an interface between a virtual cluster proxy and a virtual I/O server on a logical partitioned platform. The virtual I/O server is configured to support virtual real memory. A command is received from a virtual cluster proxy. The virtual cluster proxy identifies whether the command is a virtual real memory command or a virtualization command. Virtual real memory commands and virtualization commands are marked by the virtual cluster proxy with a virtualization marker. The virtualization marker indicates that the command is a virtual real memory command or a virtualization command. The command is then forwarded to a logical partitioned platform. A virtual memory manager intercepts the command and identifies whether the command has been marked with the virtualization marker. If the command is marked with the virtualization marker, the virtual memory manager reroutes the command to the virtual I/O server.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing an interface between a virtual cluster proxy and a virtual I/O server on a logical partitioned platform, wherein the virtual I/O server is configured to support virtual real memory, the method comprising:
    receiving a command at a virtual cluster proxy, wherein the virtual cluster proxy provides virtualization management for the logical partitioned platform;
    identifying, by the virtual cluster proxy, whether the command is a virtual real memory command or a virtualization command, wherein the command is the virtual real memory command or the virtualization command if the command invokes processes on the virtual I/O server;
    responsive to determining that the command is the virtual real memory command or the virtualization command, marking, by the virtual cluster proxy, the command with a virtualization marker, wherein the virtualization marker indicates that the command is the virtual real memory command or the virtualization command,
    forwarding, by the virtual cluster proxy, the command to a logical partitioned platform;
    intercepting the command at a virtual memory manager to identify whether the command has been marked with the virtualization marker;
    responsive to identifying that the command has been marked with the virtualization marker, re-routing the command to the virtual I/O server, wherein the virtual I/O server facilitates the sharing of physical I/O resources between logical partitions on the logical partitioned platform and is configured to support virtual real memory.

2. The computer implemented method of claim 1, wherein the virtual cluster proxy is selected from the group consisting of a hardware management console executing on a separate data processing system, and an integrated virtualization manager executing on a second logical partition.

3. The computer implemented method of claim 1, wherein the virtualization marker is a prefix appended to the command.

4. The computer implemented method of claim 1 further comprising identifying whether the command is a virtual real memory command or a virtualization command, wherein the virtualization command is selected from the group consisting of a stream count command, a paging pool creation command, a paging pool query command, a paging device creation command, a paging device update command, a paging device removal command, an all paging device removal command, a paging device activation command, a paging device deactivation command, and a paging device query command.

5. The computer implemented method of claim 1 further comprising:
    responsive to re-routing the command to the virtual I/O server, wherein the virtual I/O server is configured to support virtual real memory, executing the virtualization command to manage the virtual real memory.

6. The computer implemented method of claim 5, wherein the virtualization command is executed on a paging device supporting virtual real memory.

7. A computer implemented method for filtering virtual memory commands at a virtual I/O server on a logical partitioned platform, wherein the virtual I/O server is configured to support virtual real memory, the method comprising:

receiving a command from a virtual cluster proxy at a virtual memory manager, wherein the virtual cluster proxy provides virtualization management for the logical partitioned platform;

identifying whether the command has been marked with a virtualization marker, wherein the virtualization marker indicates that the command is a virtual real memory command or a virtualization command, wherein the command is the virtual real memory command or the virtualization command if the command invokes processes on the virtual I/O server;

responsive to identifying that the command has been marked with the virtualization marker, rerouting the command to the virtual I/O server, wherein the virtual I/O server facilitates the sharing of physical I/O resources between logical partitions on the logical partitioned platform and is configured to support virtual real memory.

8. The computer implemented method of claim 7, wherein the virtualization marker is a prefix appended to the command.

9. The computer implemented method of claim 7 further comprising receiving the command at the virtual cluster proxy, wherein the virtualization command is selected from the group consisting of a stream count command, a paging pool creation command, a paging pool query command, a paging device creation command, a paging device update command, a paging device removal command, an all paging device removal command, a paging device activation command, a paging device deactivation command, and a paging device query command.

10. The computer implemented method of claim 7 further comprising:

responsive to re-routing the command to the virtual I/O server, wherein the virtual I/O server is configured to support virtual real memory, executing the command to manage the virtual real memory.

11. A computer program product accessible from a computer-usable or computer-readable storage medium providing program code for providing an interface between a virtual cluster proxy and a virtual I/O server on a logical partitioned platform, wherein the virtual I/O server is configured to support virtual real memory, the computer program product comprising:

first instructions for receiving a command at a virtual cluster proxy, wherein the virtual cluster proxy provides virtualization management for the logical partitioned platform;

second instructions for identifying, by the virtual cluster proxy, whether the command is a virtual real memory command or a virtualization command, wherein the command is the virtual real memory command or the virtualization command if the command invokes processes on the virtual I/O server;

third instructions, responsive to determining that the command is the virtual real memory command or the virtualization command, for marking, by the virtual cluster proxy, the command with a virtualization marker, wherein the virtualization marker indicates that the command is the virtual real memory command or the virtualization command, fourth instructions for forwarding, by the virtual cluster proxy, the command to a logical partitioned platform;

fifth instructions for intercepting the command at a virtual memory manager to identify whether the command has been marked with the virtualization marker; and sixth instructions, responsive to identifying that the command has been marked with the virtualization marker, for rerouting the command to the virtual I/O server, wherein the virtual I/O server facilitates the sharing of physical I/O resources between logical partitions on the logical partitioned platform and is configured to support virtual real memory.

12. The computer program product of claim 11, wherein the virtual cluster proxy is selected from the group consisting of a hardware management console executing on a separate data processing system, and an integrated virtualization manager executing on a second logical partition.

13. The computer program product of claim 11, wherein the virtualization marker is a prefix appended to the command 14. The computer program product of claim 11, wherein the second instructions identifying whether the command is a virtual real memory command or a virtualization command further comprise instructions for identifying whether the command is a virtual real memory command or a virtualization command, wherein the virtualization command is selected from the group consisting of a stream count command, a paging pool creation command, a paging pool query command, a paging device creation command, a paging device update command, a paging device removal command, an all paging device removal command, a paging device activation command, a paging device deactivation command, and a paging device query command.

15. The computer program product of claim 11 further comprising:

seventh instructions, responsive to re-routing the command to the virtual I/O server, wherein the virtual I/O server is configured to support virtual real memory, for executing the virtualization command to manage the virtual real memory.

16. The computer program product of claim 15, wherein the seventh instructions, for executing the virtualization command to manage the virtual real memory is executed on a paging device supporting virtual real memory.

17. A logically partitioned data processing system for providing an interface between a virtual cluster proxy and a virtual I/O server on a logical partitioned platform, the data processing system comprising:

a bus;

a storage device connected to the bus, wherein the storage device contains computer usable code; and a processing unit connected to the bus, wherein the processing unit executes the computer usable code to receive a command at a virtual cluster proxy, wherein the virtual cluster proxy provides virtualization management for the logical partitioned platform, to identify, by the virtual cluster proxy, whether the command is a virtual real memory command or a virtualization command, wherein the command is the virtual real memory command or the virtualization command if the command invokes processes on the virtual I/O server, responsive to determining that the command is the virtual real memory command or the virtualization command, to mark, by the virtual cluster proxy, the command with a virtualization marker, wherein the virtualization marker indicates that the command is the virtual real memory command or the virtualization command, to forward, by the virtual cluster proxy, the command to a logical partitioned platform, to intercept the command at a virtual memory manager to identify whether the command has been marked with the virtualization marker, and responsive to identifying that the command has been marked with the virtualization marker, to reroute the command to the virtual I/O server, wherein the virtual I/O server facilitates the sharing of physical I/O resources between logical partitions on the logical partitioned platform and is configured to support virtual real memory.

18. The logically partitioned data processing system of claim 17, wherein the virtual cluster proxy is selected from the group consisting of a hardware management console executing on a separate data processing system, and an integrated virtualization manager executing on a second logical partition.

19. The logically partitioned data processing system of claim 17, wherein the virtualization marker is a prefix appended to the command.

20. The logically partitioned data processing system of claim 17, wherein the processing unit further executes the computer usable code to identifying whether the command is a virtual real memory command or a virtualization command, wherein the virtualization command is selected from the group consisting of a stream count command, a paging pool creation command, a paging pool query command, a paging device creation command, a paging device update command, a paging device removal command, an all paging device removal command, a paging device activation command, a paging device deactivation command, and a paging device query command.

21. The logically partitioned data processing system of claim 17 wherein the processing unit further executes the computer usable code, responsive to re-routing the command to the virtual I/O server, wherein the virtual I/O server is configured to support virtual real memory, to execute the virtualization command to manage the virtual real memory.

22. The logically partitioned data processing system of claim 21, wherein the processing unit further executes the computer usable code, responsive to re-routing the command to the virtual I/O server, wherein the virtual I/O server is configured to support virtual real memory, to execute the virtualization command to manage the virtual real memory, wherein the virtualization command is executed on a paging device supporting virtual real memory.

23. A computer program product accessible from a computer-usable or computer-readable storage medium providing program code for filtering virtual memory commands at a virtual I/O server on a logical partitioned platform, wherein the virtual I/O server is configured to support virtual real memory, wherein the virtual I/O server is configured to support virtual real memory, the computer program product comprising computer implemented method, the method comprising:
   first instructions for receiving a command from a virtual cluster proxy at a virtual memory manager, wherein the virtual cluster proxy provides virtualization management for the logical partitioned platform;
   second instructions for identifying whether the command has been marked with a virtualization marker, wherein the virtualization marker indicates that the command is a virtual real memory command or a virtualization command, wherein the command is the virtual real memory command or the virtualization command if the command invokes processes on the virtual I/O server;
   third instructions, responsive to identifying that the command has been marked with the virtualization marker, for rerouting the command to the virtual I/O server, wherein the virtual I/O server facilitates the sharing of physical I/O resources between logical partitions on the logical partitioned platform and is configured to support virtual real memory.

24. The computer program product of claim 23, wherein the virtualization marker is a prefix appended to the command.

25. The computer program product of claim 23 wherein the second instructions identifying whether the command is a virtual real memory command or a virtualization command further comprise instructions for receiving the command at the virtual cluster proxy, wherein the virtualization command is selected from the group consisting of a stream count command, a paging pool creation command, a paging pool query command, a paging device creation command, a paging device update command, a paging device removal command, an all paging device removal command, a paging device activation command, a paging device deactivation command, and a paging device query command.

* * * * *